United States Patent [19]
Smith et al.

[11] Patent Number: 5,674,999
[45] Date of Patent: Oct. 7, 1997

[54] PROCESS FOR PREPARING READILY DISPERSIBLE WATER-SOLUBLE CELLULOSIC POLYMERS

[75] Inventors: Michael R. Smith, Baton Rouge, La.; Gary J. Schulz, Midland, Mich.; Kenneth C. Reibert, Baton Rouge, La.

[73] Assignee: The Dow Chemical Company, Midland, Mich.

[21] Appl. No.: 574,066

[22] Filed: Dec. 18, 1995

[51] Int. Cl.$^6$ .............. C08B 3/00; C08B 3/22; C08G 63/48

[52] U.S. Cl. .............. 536/56; 536/58; 536/63; 536/64; 536/65; 536/68; 536/69; 536/70; 536/76; 536/80; 525/54.3

[58] Field of Search .............. 536/56, 58, 63, 536/64, 65, 68, 69, 70, 76, 80; 525/54.3

[56] References Cited

U.S. PATENT DOCUMENTS

| | | | |
|---|---|---|---|
| 3,090,606 | 5/1963 | Burnett | 836/57 |
| 4,537,958 | 8/1985 | Strange et al. | 536/85 |

Primary Examiner—Nathan M. Nutter

[57] ABSTRACT

An improved process for surface treating water soluble cellulosic polymers with crosslinking agents to provide products which are more readily dispersible in cold water, and have longer viscosity delay times than can be achieved with polymers treated in low intensity mixers, such as ribbon blenders, comprising distributing the crosslinking agent using a continuous, high intensity mixer, followed by heating to facilitate surface crosslinking. This process also allows for a reduced level of crosslinking chemicals to be used.

6 Claims, No Drawings

PROCESS FOR PREPARING READILY DISPERSIBLE WATER-SOLUBLE CELLULOSIC POLYMERS

This invention relates to a method for preparing readily dispersible water-soluble cellulose derivatives.

BACKGROUND OF THE INVENTION

Water soluble products, such as cellulosic polymers, are not readily dispersible in cold water in powder form. It is widely known that they can be made generally dispersible by treating with a crosslinking agent such as glyoxal or other aldehyde, in a process sometimes referred to as surface treatment. This process is usually carried out batch-wise in a ribbon blender or other such mixer, over a period of several hours for each batch. Such processes suffer from lack of uniformity of crosslinking of the polymer, which results in a requirement for more crosslinking of the polymer by adding additional crosslinking chemicals or more agitation when adding the polymers to water. This lack of uniformity can be seen and measured by observing the length of time required for the polymer to disperse when added to cold water containing a small amount of sodium bicarbonate or other base. Polymers crosslinked in the known processes often require as much as 60 seconds to disperse in this test. The batch process also limits the temperature that the reaction can be carried out to a temperature that will not degrade the polymer or degrade crosslinkages during the time that the product is being mixed. This forces the reaction to be run at a relatively low temperature which results in a gradual increase in the degree of crosslinking over a period of many hours. This low temperature process means that it is difficult to achieve a consistent degree of crosslinking, which is measured by the viscosity delay time, while at the same time making product that is easily dispersible in water without lumping. Another reason the temperature has to be kept lower in a ribbon blender than optimum for reaction is that if the reaction proceeds too quickly, the crosslinking agent does not get distributed evenly enough on the polymer to achieve an easily dispersible product, because the distribution of the crosslinking agent occurs too slowly compared to the reaction at higher temperatures.

In view of the foregoing considerations, it would be desirable, and it is an object of the present invention, to provide a novel process whereby cellulose-based products can be made with improved dispersibility in cold water.

SUMMARY OF THE INVENTION

We have discovered that this surface treating process can be carried out much faster if the chemical crosslinking agents are distributed on the cellulosic polymer using a high intensity mixer, preferably a continuous high intensity mixer. After achieving the distribution of the crosslinking agent in this way, the product can be heated to higher temperatures than can be used in the ribbon blender process, so that the crosslinking reaction is driven to completion in a much shorter time. This means that the product has a much more reproducible degree of crosslinking, and that less of the crosslinking agent is needed to achieve the degree of dispersibility required or the amount of crosslinking desired, which is measured by the viscosity delay time of the polymer. We have also unexpectedly discovered that polymer surface treated in this type of equipment is more easily dispersible in water, regardless of how the product is heated after the chemicals are distributed. Polymer that has been crosslinked in a continuous, high intensity mixer disperses in approximately one half the time of product made in the low intensity ribbon blender with the same amount of crosslinking agent.

DETAILS OF THE INVENTION

The present invention is characterized in that dispersion time of cellulose products surface treated in a batch or continuous high intensity mixer, preferably a continuous high intensity mixer, is significantly shorter than values obtained for cellulose products surface treated in a ribbon blender or other low intensity process. It is known that crosslinking of the surface of cellulose products with an aldehyde, such as glyoxal, affects the rate at which such products are dispersed into finely divided particles in aqueous media instead of agglomerating into lumps. Typical processes, such as those utilizing a batch process or a ribbon blender, can take many hours of mixing, and utilize higher levels of crosslinking chemicals, to produce a product with an acceptable dispersion time. Samples of cellulose products treated in these processes were used as controls for dispersion time and viscosity delay time experiments.

In this application, dispersion time means the length of time required for 9 g of polymer to completely disperse (i.e. no visible lumps remain) in 291 ml of a 100 ppm $NaHCO_3$ solution when stirred at 200–300 rpm with a paddle stirrer. Viscosity delay time is the time required for 400 ml of a 2 percent slurry of polymer in a 25–100 ppm $NaHCO_3$ solution to develop about 10 percent of its final solution viscosity. Factors which impact dispersibility of cellulose products in cold water include the distribution of the crosslinking agent on the cellulose polymer, the total amount of crosslinking chemicals applied, and the degree of reaction of the glyoxal. The total amount of chemicals applied to the surface of the polymer as well as the degree of reaction of the glyoxal affect the viscosity delay time.

A feature of the invention is that a high amount of energy is put into a small amount of product during the initial contact of the product with the treating chemicals. Such intense mixing at the moment the chemicals contact the product is critical to achieving the very uniform distribution of chemicals possible with this invention compared to other ways of mixing powders and liquids.

One way to describe this mixing is to the amount of horsepower per pound of powder in the mixing equipment. A typical small scale vertical batch mixer may have, for example, a 4 horsepower motor, with an agitated volume of 0.10 cubic feet. A typical batch size in this mixer would be 3.3 lbs, so that the ratio of power to product is 1.2 hp/lb, and the power per unit volume is 40 hp/cu. ft. Chemicals are added via a spray nozzle to the surface of the batch, and distribution of the chemicals depends on the circulation of the powder contacted with the chemicals into the mixing zone of the mixer, which may be only 50% of the total volume or less.

In the case of the high intensity continuous mixer, such as a TURBULIZER Model TCS 8 manufactured by Hosokawa Bepex Corporation, Minneapolis, Minn., the motor power may be, for example, 15 horsepower, with an agitated volume of 0.54 cu. ft., giving a hp/vol ratio of 28 hp/cu.ft. Since it is a continuous mixer, the product loading density is calculated from the flow rate and residence time. In the case of the Turbulizer, the effective amount of product in the Turbulizer during the chemical addition is 0.63 lb. This gives a power to product ratio of 44.4 hp/lb. In addition, the chemicals are added directly to the mixing zone so that maximum distribution of chemicals is achieved. Any equipment which meets the criteria of 1) high power input per mass of powder, and 2) direct addition of chemicals to the mixing zone would have the potential to produce product with highly uniform distribution of chemicals thereon.

The intensity of mixing is often quantified by the agitator tip speed given in units of ft/min. In high intensity mixers such as a Model FM 200 Henschel and a model WC 180 Littleford, representing the batch process, and a Model TCS 8 Turbulizer representing the continuous process, tip speeds ranged from about 3,000 to about 5,500 ft/min, while the tip speed of the low intensity ribbon blender is of the order of 300 to 400 ft/min.

In the following examples the ratio of crosslinking agent to cellulosic polymer in the finished treated state ranged from about 0.0025 to about 0.05. Product temperatures ran as high as 130 deg.C. with the majority in the 80 to 118 deg.C. range.

The following examples illustrate the mode of carrying out the invention. It should be understood that specific proportions and reaction conditions utilized therein are not intended as limitations on the invention other than as delineated by the claims.

EXAMPLE 1

Hydroxypropyl methyl cellulose with a methoxyl degree of substitution of 1.43 and hydroxypropoxyl molar substitution of 0.73 was fed into a heated Turbulizer brand continuous, high intensity mixer at a rate of 336 lbs/hour. A mixture of chemicals containing 36.0 percent glyoxal was fed into the liquid inlet port of the mixer at a rate such that the ratio of treating chemicals to cellulose powder was 0.030. Product from the mixer was fed into a torus disc dryer, (manufactured by Hosokawa Bepex Corporation) which turned at a rate of 60 rpm and was maintained at a temperature of 130 deg.C. such that the powder achieved a temperature of 101–118 deg.C. for 15 minutes, which was the average residence time of the torus disc dryer. The product from the dryer was fed into a thermal screw, which cooled the product to ambient temperature over a period of about 10 minutes, which was the residence time of the thermal screw. Samples of the product were taken at approximately 15 minute intervals. The viscosity delay time and time to disperse were measured for each sample. The average time to disperse for samples made in the Turbulizer was 19 seconds, compared to an average time to disperse of 31 seconds for the same product made in a low intensity ribbon blender process, using approximately the same mixture and using 33 percent more chemicals. The average viscosity delay time for samples made in the Turbulizer was 39 minutes, compared to 52 minutes for the same product made in a ribbon blender.

EXAMPLE 2

In a second run, the same starting material as in Example 1 was fed into the continuous high intensity mixer, which was not heated in this instance, at a rate of 239 lbs/hour. A mixture of chemicals containing 24.6 percent glyoxal was fed into the liquid inlet port of the Turbulizer at a rate such that the ratio of treating chemicals to cellulose powder was 0.041. Product from the Turbulizer was fed into a torus disc dryer, which turned at a rate of 60 rpm and was maintained at a temperature of 115 deg.C. such that the powder achieved a temperature of 82–100 deg.C. for approximately 15 minutes which is the average residence time of the torus disc dryer. The product from the dryer was fed into a thermal screw, which cooled the product to ambient temperature over a period of about 10 minutes, which was the residence time of the thermal screw. Samples of the product were taken at 15 minute intervals and the viscosity delay time and the time to disperse was measured for each sample. The average time to disperse samples made in the high intensity mixer was 5 seconds, compared to an average time to disperse of 26 seconds for the same product made in a ribbon blender process, using the same mixture and amount of chemicals. The average viscosity delay time for samples made in the Turbulizer was 30 minutes, compared to 23 minutes for the same product made in the ribbon blender.

EXAMPLE 3

In a third run, the same starting material as used in Example 1 was fed into the continuous high intensity mixer, the jacket of which was heated at 85 deg.C., at a rate of 300 lbs/hr. A mixture of chemicals containing 24.6% glyoxal was fed into the liquid inlet port of the mixer at a constant rate such that a weight ratio of chemicals to cellulosic polymer of 0.041 was achieved. The product from the Turbulizer was then fed into a low intensity ribbon blender heated to a temperature of 80 deg.C. for a period of 20 minutes, so that 100 lbs of starting material containing about 4.1 lbs of chemicals was transferred to the blender. The blender was heated to maintain a product temperature of from 65 to 80 deg.C. After heating for an additional 10 minutes, the treated product was found to disperse in 20 seconds and had a viscosity delay time of 7 minutes. After an additional 30 minutes of blending time a sample dispersed in 15 secs and had a viscosity delay time of 12 minutes.

A comparison run was made in the same ribbon blender, using the same product, by loading 100 lbs of the untreated cellulosic polymer product into the ribbon blender which was heated to a temperature of 80 deg.C. The same amount of treating chemicals was sprayed onto the product through three spray nozzles, using a pressure of 200 psig to force the chemicals through the nozzles over a 1 minute period. The polymer product was heated to a temperature of 65 to 80 deg.C. After mixing and heating for 30 minutes a sample failed to disperse in 2 minutes, and had a viscosity delay time of less than 1 minute. After mixing and heating for a total time of 3.5 hours, a sample dispersed in 29 seconds and had a viscosity delay time of 12 minutes. An additional 1.5 hours of mixing and heating resulted in no significant change.

EXAMPLE 4

In a fourth run, a cellulosic polymer derivative with a hydroxypropyl substitution of about 27% was treated at 300 lb per hour in the high intensity mixer with a 0.032 ratio of chemical mixture containing 36% glyoxal. The mixed product was then transferred to a heated ribbon blender as in Example 3 above. A sample from the blender was found to disperse in 35 seconds and had a viscosity delay time of 27 minutes.

In a comparative example, the same cellulosic polymer derivative was treated in the heated ribbon blender with the same level of the same chemicals. After 1 hour of mixing and heating, a sample failed to disperse in 2 minutes and had a viscosity delay time of 7 minutes. After 2.5 hours of mixing, a sample dispersed in 48 seconds and had a viscosity delay time of 27 minutes.

Results from the effects of degree of mixing intensity and the amount of chemicals spray mixed with the cellulose polymers on dispersibility in cold water are given in Table 1

TABLE 1

| Sample ID | Low intensity | | High intensity | |
|---|---|---|---|---|
| | % Chemical | Dispersion Time (sec.) | % Chemical | Dispersion Time (sec.) |
| D | 3.8 | 31.6 | 3.2 | 13.1 |
| E | 4.1 | 36.5 | 3.9 | 22.4 |
| F | 2.0 | 49.7 | 1.8 | 9.5 |
| G | 4.0 | 33.7 | 3.4 | 16.9 |
| H | 4.0 | 25.6 | 4.1 | 5.3 |
| I | 4.0 | 31.0 | 3.0 | 19.2 |
| J | 4.0 | 32.4 | 2.8 | 23.4 |

These data indicate that under high intensity conditions the time to disperse in cold water is considerably lower than with conventional low intensity mixing and at a lower level of chemicals used.

The effect of mixing intensity and the amount of chemicals spray mixed with the cellulose polymers on the viscosity delay time are given in Table 2.

TABLE 2

| Sample ID | Low intensity | | High intensity | |
|---|---|---|---|---|
| | % chemical | Delay time (min.) | % chemical | Delay time (min.) |
| A | 2.3 | 9.0 | 1.3 | 10.2 |
| B | 2.4 | 27.9 | 2.5 | 31.8 |
| C | 3.8 | 32.6 | 2.8 | 37.2 |
| D | 3.8 | 35.4 | 3.2 | 42.1 |
| E | 4.1 | 72.6 | 3.9 | 107.4 |
| F | 2.0 | 15.3 | 1.8 | 20.1 |
| G | 4.0 | 66.1 | 3.4 | 87.7 |
| H | 4.0 | 23.4 | 4.1 | 29.7 |
| I | 4.0 | 52.2 | 3.0 | 38.9 |
| J | 4.0 | 31.3 | 2.8 | 32.0 |

These data indicate the benefits in increasing the viscosity delay time afforded by high intensity mixing and at a lower level of chemical usage.

The samples A–J listed in Tables 1 and 2 can be further identified by the methoxyl degree of substitution and the hydroxypropoxyl molar substitution. Values are given in Table 3.

TABLE 3

| Sample ID | Methoxyl degree of substitution | Hydroxypropoxyl molar substitution |
|---|---|---|
| A | 1.9 | 0.1 |
| B | 1.9 | 0.1 |
| C | 1.9 | 0.2 |
| D | 1.5 | 0.3 |
| E | 1.4 | 0.8 |
| F | 1.4 | 0.8 |
| G | 1.4 | 0.8 |
| H | 1.4 | 0.7 |
| I | 1.4 | 0.7 |
| J | 1.4 | 0.7 |

The net results of these experiments is that cellulose polymer that had been surface treated in the continuous, high intensity mixer, and then heated in either a Torus Disc dryer or a heated ribbon blender was more highly functionalized having a significantly faster dispersion time and higher viscosity delay time than the same product made in a low intensity heated ribbon blender process with generally a lower usage level of glyoxal crosslinking agent.

What is claimed is:

1. A process for treating the surface of a cellulosic polymer to increase its dispersability in water which comprises: mixing said polymer with liquid glyoxal in a ratio of glyoxal to polymer of from about 0.0025 to about 0.035 in a high intensity mixer followed by heating.

2. A process as recited in claim 1 wherein said high intensity mixer is a continuous mixer.

3. A process as recited in claim 1 wherein the treated cellulosic polymer attained a temperature of from about 70 deg.C. to about 130 deg.C.

4. A process as recited in claim 2 wherein the treated cellulosic polymer attained a temperature of from about 70 deg.C. to about 130 deg.C.

5. A process as recited in claim 1 wherein the mixer tip speed is greater than 1,000 ft/min.

6. A process as recited in claim 2 wherein the mixer tip speed is greater than 1,000 ft/min.

* * * * *